US012418776B2

United States Patent
Zhang

(10) Patent No.: US 12,418,776 B2
(45) Date of Patent: Sep. 16, 2025

(54) COMMUNICATION METHOD AND APPARATUS OF MULTICAST AND BROADCAST SERVICE, ELECTRONIC DEVICE, AND STORAGE MEDIUM

(71) Applicant: TENCENT TECHNOLOGY (SHENZHEN) COMPANY LIMITED, Shenzhen (CN)

(72) Inventor: Zhuoyun Zhang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 502 days.

(21) Appl. No.: 17/982,289

(22) Filed: Nov. 7, 2022

(65) Prior Publication Data

US 2023/0055967 A1 Feb. 23, 2023

Related U.S. Application Data

(63) Continuation of application No. PCT/CN2021/111400, filed on Aug. 9, 2021.

(30) Foreign Application Priority Data

Sep. 8, 2020 (CN) .......................... 202010939112.9

(51) Int. Cl.
*H04W 4/02* (2018.01)
*G06Q 30/02* (2023.01)
(Continued)

(52) U.S. Cl.
CPC ........... *H04W 4/08* (2013.01); *H04W 64/006* (2013.01)

(58) Field of Classification Search
CPC ....... H04W 4/08; H04W 4/30; H04W 64/006; H04W 4/06; H04W 76/15; H04W 76/40; H04W 4/021; H04W 64/003
(Continued)

(56) References Cited

U.S. PATENT DOCUMENTS

2004/0073928 A1* 4/2004 Alakoski ............. H04L 12/1886
455/433
2013/0188548 A1* 7/2013 Lee ....................... H04W 76/40
370/312
(Continued)

FOREIGN PATENT DOCUMENTS

| CN | 109286567 A | 1/2019 |
|---|---|---|
| CN | 109769150 A | 5/2019 |

(Continued)

OTHER PUBLICATIONS

IP.com search (Year: 2025).*
(Continued)

*Primary Examiner* — Moustapha Diaby
(74) *Attorney, Agent, or Firm* — ANOVA LAW GROUP, PLLC

(57) ABSTRACT

A communication method includes: receiving a multicast and broadcast service (MBS) rule issued by a policy control functional entity, the MBS rule being generated by the policy control functional entity based on a service request message transmitted by an application functional entity, and the service request message including information of an MBS service region; determining whether the user terminal is located in the MBS service region according to the MBS rule and position information of the user terminal; and accessing an MBS service in the MBS service region in response to a determination that the user terminal is located in the MBS service region.

20 Claims, 6 Drawing Sheets

(51) Int. Cl.
*H04W 4/08* (2009.01)
*H04W 8/18* (2009.01)
*H04W 64/00* (2009.01)

(58) Field of Classification Search
USPC ........................................................ 455/414.1
See application file for complete search history.

(56) References Cited

U.S. PATENT DOCUMENTS

| | | | | |
|---|---|---|---|---|
| 2020/0267513 | A1* | 8/2020 | Zhu | H04N 21/6131 |
| 2021/0075631 | A1* | 3/2021 | Liao | H04M 15/8038 |
| 2021/0184965 | A1 | 6/2021 | Wang | |
| 2021/0219106 | A1 | 7/2021 | Li et al. | |
| 2022/0053455 | A1* | 2/2022 | Baek | H04W 4/08 |
| 2022/0264258 | A1* | 8/2022 | Zong | H04W 76/11 |
| 2022/0264527 | A1* | 8/2022 | Zong | H04W 28/0252 |
| 2022/0329983 | A1* | 10/2022 | Jeong | H04W 12/06 |
| 2022/0400358 | A1* | 12/2022 | Son | H04L 67/51 |
| 2023/0209446 | A1* | 6/2023 | Kim | H04W 4/021 370/329 |
| 2023/0308840 | A1* | 9/2023 | Shi | H04W 12/06 |

FOREIGN PATENT DOCUMENTS

| | | | |
|---|---|---|---|
| CN | 110972078 | A | 4/2020 |
| CN | 111491346 | A | 8/2020 |
| CN | 112073919 | A | 12/2020 |
| WO | 2019196608 | A1 | 10/2019 |
| WO | 2019219038 | A1 | 11/2019 |

OTHER PUBLICATIONS

The World Intellectual Property Organization (WIPO) International Search Report for PCT/CN2021/102627 Oct. 11, 2021 7 Pages (including translation).
"New MBS architecture and procedures", Jan. 17, 2020, SA WG Meeting#136AH, Incheon Korea.
"KI #1, New Sol: MBS Multicast UE Context Activation and MBS Session Management without UE IP address", Jun. 12, 2020, SA WG2 Meeting #139E.
"Solution for local MBS multicast service discovery", Jan. 17, 2020, SA WG2 Meeting #136AH, Incheon Korea.
China National Intellectual Property Administration (CNIPA) Office Action 1 for 202010939112.9 Jan. 5, 2023 40 Pages (including translation).
3GPP TR 23.757 V0.4.0, 3rd Generation Partnership Project; Technical Specification Group Services and System Aspects; Study on architectural enhancements for 5G multicast-broadcast services (Release 17), Jun. 2020 15 pages.
Juniper Networks et al. "SA WG2 Meeting #S2-139e", "S2-2004162 , Alignment on the use of terminologies for delivery methods", Jun. 12, 2020(Jun. 12, 2020).
China National Intellectual Property Administration (CNIPA) Office Action 1 for 202010939112.9 Mar. 23, 2023 14 Pages (including translation).

* cited by examiner

COMMUNICATION METHOD AND APPARATUS OF MULTICAST AND BROADCAST SERVICE, ELECTRONIC DEVICE, AND STORAGE MEDIUM

RELATED APPLICATION(S)

This application is a continuation application of PCT Patent Application No. PCT/CN2021/111400 filed on Aug. 9, 2021, which claims priority to Chinese Patent Application No. 202010939112.9, entitled "COMMUNICATION METHOD AND APPARATUS OF MULTICAST AND BROADCAST SERVICE, ELECTRONIC DEVICE, AND STORAGE MEDIUM" and filed with the China National Intellectual Property Administration on Sep. 8, 2020, all of which are incorporated herein by reference in entirety.

FIELD OF THE TECHNOLOGY

The present disclosure relates to the field of computer and communication technologies, and in particular, to a multicast and broadcast service.

BACKGROUND

In a 5G multicast and broadcast service (MBS) system, support for a service region of the MBS service is often deficient, and access of the MBS service is implemented through a control plane, resulting in additional signaling load in the 5G MBS system.

SUMMARY

Embodiments of the present disclosure provide a communication method and apparatus of a multicast and broadcast service, an electronic device, and a computer-readable storage medium, which can not only support a desirable of a service region of a multicast and broadcast service (MBS) service, but also implement access of the MBS service based on a manner of a user plane, thus reducing a signaling load of a 5G MBS system.

Other features and advantages of the present disclosure become apparent from the following detailed description, or may be learned in part through practice of the present disclosure.

In one aspect, the present disclosure provides a communication method of a multicast and broadcast service. The method includes: receiving an MBS rule issued by a policy control functional entity, the MBS rule being generated by the policy control functional entity based on a service request message transmitted by an application functional entity, and the service request message including information of an MBS service region; determining whether the user terminal is located in the MBS service region according to the MBS rule and position information of the user terminal; and accessing an MBS service in the MBS service region in response to a determination that the user terminal is located in the MBS service region.

In another aspect, the present disclosure provides a communication method of a multicast and broadcast service. The method includes: generating a service request message, the service request message including information of an MBS service region, the service request message being used for triggering a policy control functional entity to generate an MBS rule for a user terminal, and the MBS rule being used for instructing the user terminal to access the MBS service in the MBS service region; and transmitting the service request message to the policy control functional entity.

In yet another aspect, the present disclosure provides a communication method of a multicast and broadcast service. The method includes: receiving a service request message transmitted by an application functional entity, the service request message including information of an MBS service region; generating an MBS rule for a user terminal in response to the service request message, the MBS rule being used for instructing the user terminal to access an MBS service within the MBS service region; and transmitting the MBS rule to the user terminal.

In yet another aspect, the present disclosure provides a communication apparatus of a multicast and broadcast service. The apparatus includes: a memory storing computer program instructions; and a processor coupled to the memory and configured to execute the computer program instructions and perform: receiving a multicast and broadcast service (MBS) rule issued by a policy control functional entity, the MBS rule being generated by the policy control functional entity based on a service request message transmitted by an application functional entity, and the service request message comprising information of an MBS service region; determining whether the user terminal is located in the MBS service region according to the MBS rule and position information of the user terminal; and accessing an MBS service in the MBS service region in response to a determination that the user terminal is located in the MBS service region.

In yet another aspect, the present disclosure provides a non-transitory computer-readable storage medium storing computer program instructions executable by at least one processor to perform: receiving a multicast and broadcast service (MBS) rule issued by a policy control functional entity, the MBS rule being generated by the policy control functional entity based on a service request message transmitted by an application functional entity, and the service request message comprising information of an MBS service region; determining whether the user terminal is located in the MBS service region according to the MBS rule and position information of the user terminal; and accessing an MBS service in the MBS service region in response to a determination that the user terminal is located in the MB S service region.

In yet another aspect, the present disclosure provides an electronic device. The electronic device includes a processor and a memory, the memory storing computer-readable instructions, and the computer-readable instructions, when executed by the processor, implementing the communication method of a multicast and broadcast service described in the aspects.

According to an aspect of the embodiments of the present disclosure, a computer program product or a computer program is provided, the computer program product or the computer program including computer instructions, and the computer instructions being stored in a computer-readable storage medium. A processor of a computing device reads the computer instructions from the computer-readable storage medium, and executes the computer instructions, to cause the computing device to perform the communication method of a multicast and broadcast service described in the aspects.

In the technical solutions provided in some embodiments of the present disclosure, the application functional entity transmits the service request message to the policy control functional entity, and the service request message includes the information of the MBS service region. The policy control functional entity generates the MBS rule according to the received service request message, and transmits the MBS rule to the user terminal. The MBS rule is used for instructing the user terminal located in the MBS service region to access the MBS service. Therefore, when the user terminal wants to access the MBS service, the user terminal determines whether it is located in the MBS service region according to the MBS rule. If it is determined to be yes, the user terminal can join the MBS service by joining the existing MBS session in the MBS service or creating a new MBS session.

Therefore, in the technical solutions provided in the embodiments of the present disclosure, only the user terminal located in the MBS service region can access to the MBS service, thereby supporting restriction on the MBS service region. In addition, the user terminal located in the MBS service region can actively access to the MBS service according to the MBS rule, which can avoid achieving access of the MBS service through the control plane, so that there is no additional signaling load in the 5G MBS system.

The technical solutions of the embodiments of the present disclosure can support the MBS service region, and the user terminal located in the MBS service region actively accesses to the MBS service according to the MBS rule, so that there is no additional signaling load in the 5G MBS system.

It is to be understood that the general description and the following detailed description are merely exemplary and explanatory and are not intended to limit the present disclosure.

Other aspects of the present disclosure can be understood by those skilled in the art in light of the description, the claims, and the drawings of the present disclosure.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

DETAILED DESCRIPTION

Figure 1:
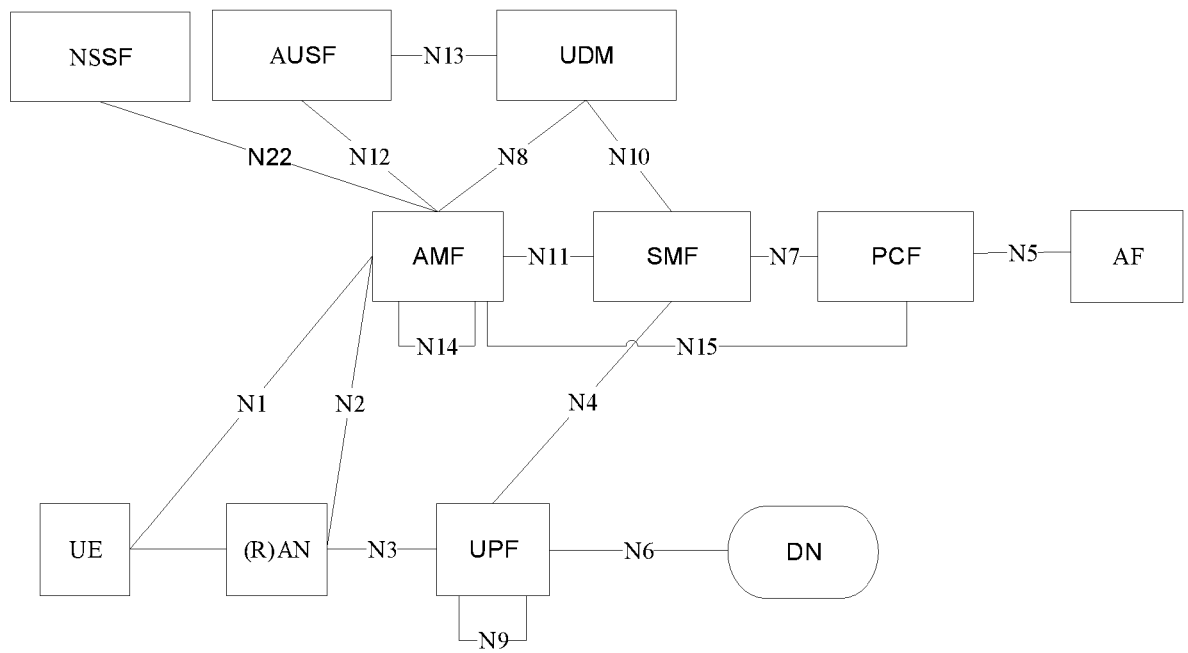
FIG. 1 is a schematic diagram of a 5G mobile communication network architecture according to certain embodiment(s) of the present disclosure.

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

When and as applicable, the term "an embodiment," "one embodiment," "some embodiment(s), "some embodiments," "certain embodiment(s)," or "certain embodiments" may refer to one or more subsets of all possible embodiments. When and as applicable, the term "an embodiment," "one embodiment," "some embodiment(s), "some embodiments," "certain embodiment(s)," or "certain embodiments" may refer to the same subset or different subsets of all the possible embodiments, and can be combined with each other without conflict.

In certain embodiments, the term "based on" is employed herein interchangeably with the term "according to."

The described features, structures, or characteristics may be combined in one or more embodiments in any appropriate manner. In the following descriptions, more specific details are provided to provide a comprehensive understanding of the embodiments of the present disclosure. However, a person skilled in the art is to be aware that, the technical solutions in the present disclosure may be implemented without one or more of the specific details, or another method, unit, apparatus, or step may be used. In other cases, well-known methods, apparatuses, implementations, or operations are not shown or described in detail, to avoid obscuring aspects of the present disclosure.

The block diagrams shown in the accompanying drawings are merely functional entities and do not necessarily correspond to physically independent entities. That is, the functional entities may be implemented in a software form, or in one or more hardware modules or integrated circuits, or in different networks and/or processor apparatuses and/or microcontroller apparatuses.

The flowcharts shown in the accompanying drawings are merely examples for descriptions, do not need to include all content and operations/steps, and do not need to be performed in the described orders either. For example, some operations/steps may be further divided, while some operations/steps may be combined or partially combined. Therefore, an actual execution order may change according to an actual case.

"Plurality of" mentioned in the present disclosure means two or more. "And/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

FIG. 1 is a schematic diagram of a 5G (5th Generation Mobile Communication Technology) network architecture defined in TS23.501 section of a 3GPP (3rd Generation Partnership Project) protocol.

As shown in FIG. 1, a 5G mobile communication network includes functional entities such as UE (User Equipment), (R)AN ((Radio) Access Network), UPF (User Plane Function), AMF (Access and Mobility Management Function), SMF (Session Management Function), AF (Application Function), PCF (Policy Control Function). The AMF, SMF and UPF constitute a 5G core network. The AMF is responsible for achieving UE access and mobility management, the SMF is responsible for achieving service session management, and the UPF is responsible for achieving data packet routing and forwarding between the (R)AN and DN (Data Network). The various functional entities mentioned above may be configured in or implemented through a communication device. The communication device may be a server. The server may be an independent physical server, or may be a server cluster including a plurality of physical servers or a distributed system, or may be a cloud server providing a cloud computing service.

The technical solutions of the embodiments of the present disclosure is proposed based on the 5G network architecture shown in FIG. 1, and an implementation flow of supporting an MBS service region in the 5G mobile communication network is provided. In the implementation flow, the UE is controlled to access an MBS service based on a mode of a user plane, thereby avoiding a problem of additional signaling load in a 5G network caused by controlling the UE to join the MBS service through a mode of a control plane. When the 5G network architecture supports the MBS service, a network function may be expanded and added, and this solution can be further extended to a newly added network function that achieves a similar function, without limiting a specific execution body of the newly added function in this solution.

Figure 2:
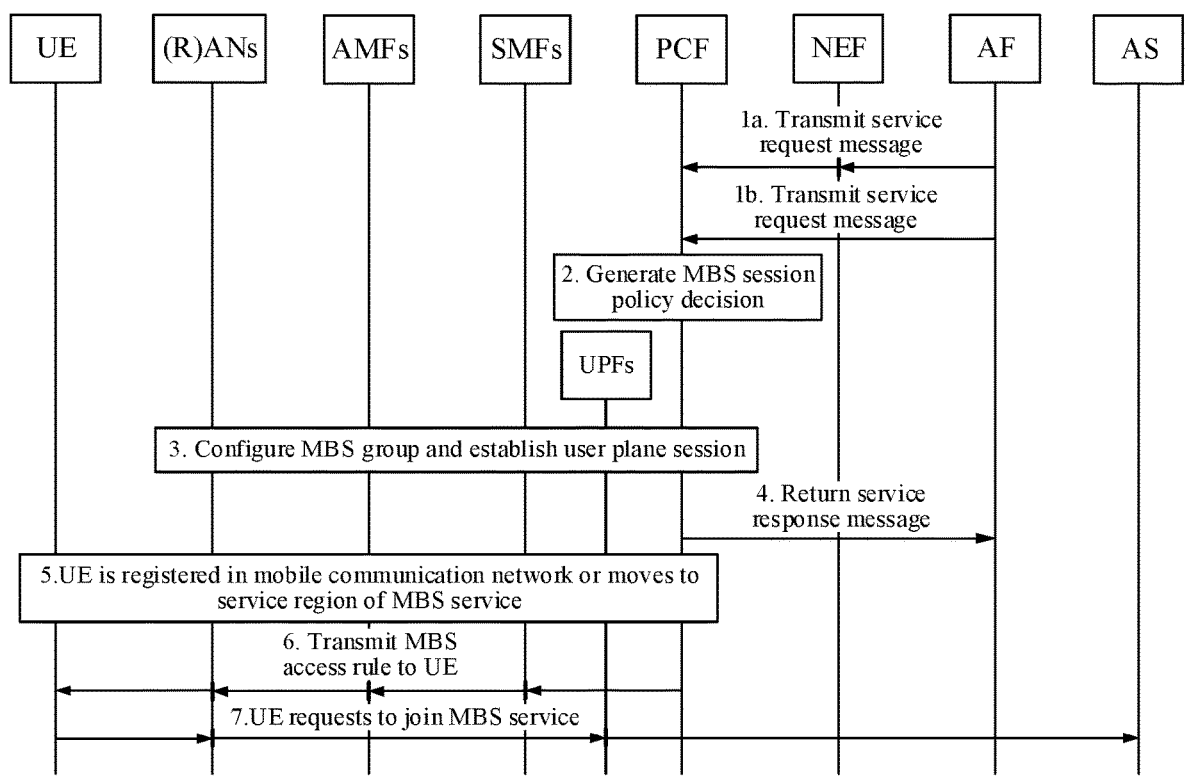
FIG. 2 is a schematic flowchart of a service supporting an MBS service region under the 5G mobile communication network according to certain embodiment(s) of the present disclosure.

FIG. 2 is a schematic flowchart of a service supporting an MBS service region under the 5G mobile communication network according to an exemplary embodiment. As shown in FIG. 2, in this exemplary service process, the AF first transmits a service request message to the PCF (as in step 1*a* or step 1*b* shown in FIG. 2).

The service request message may include an IP (Internet Protocol) address of the MBS service, information of QoS (Quality of Service) desirables, information of the MBS service region, and AF identification information. If service time of the MBS service is specific time, the service request message further includes information of MBS effective service time. If the MBS service is a multicast service, the service request message further includes multicast group identification information. If the MBS service has subdivided different QoS desirables, service request information further includes subdivided differentiator information, such as DSCP (Differentiated Services Code Point) or TOS (Type of Service)/TC (Traffic Class) field information, to correspond to QoS desirables of different types of service flows under the same MBS session based on/TC for identifying different service flows and carried in the TOS/TC field information.

The service region of the MBS service and the effective service time of the MBS service are independent of each other. In some embodiments, if the service time of the MBS service is specific time, but there is no limit on the service region, corresponding service request message includes information of the MBS effective service time and does not include information of the MBS service region.

There may be at least two ways for the AF to transmit the service request message to the PCF. As shown in FIG. 2, the AF may directly transmit the service request message to the PCF (for example, step 1*b* in FIG. 2), or the AF may transmit the service request message to an NEF (Network Exposure Function), to forward the service request message to the PCF based on the NEF (for example, step 1*a* in FIG. 2). The AF may select a method to transmit the service request message to the PCF according to conditions such as a network deployment condition in the 5G mobile communication network, and whether the AF is trusted relative to the 5G mobile communication network. For example, if the AF is trusted relative to the 5G mobile communication network, the AF directly transmits the service request message to the PCF, and this is not limited in this embodiment.

In an embodiment in which the AF transmits the service request message to the NEF, and forwards the service request message to the PCF based on the NEF. After receiving the service request message transmitted by the AF, the NEF can perform authentication on the MBS service request initiated by the AF according to the AF identification information included in the service request message. If the authentication is passed, it means that the NEF accepts the MBS service request, so the service request message is forwarded to the PCF, and the NEF also interacts with UDR (User Data Repository), to configure and store information of a multicast group. If the authentication fails, the NEF rejects the MBS service request initiated by the AF, and transmits a rejection notification message to the AF. The rejection notification message may include a rejection reason value.

According to the received service request message, the PCF generates a PCC (Policy Control and Charging) rule corresponding to the MBS service requested by the AF, and generates an MBS rule for the UE. The MBS rule includes an MBS service policy (for example, step 2 in FIG. 2). For example, the MBS rule may include information such as traffic description information, routing information, effective region and/or effective time of the MBS service policy. The traffic description information may include information such as application description information, IP address of the MBS service, domain name information, multicast group identification information, connection attribute (used for indicating broadcast service or multicast service). The routing information may include information such as S-NSSAI (Single Network Slice Selection Assistance Information) and DNN (Data Network Name). The effective region of the MBS service policy corresponds to information of the MBS service region included in the service request message transmitted by the AF, and the effective time of the MBS service policy corresponds to information of the MBS effective service time included in the service request message transmitted by the AF.

In some exemplary embodiments, the PCF further generates a URSP (user equipment routing selection policy) rule according to the received service request message, and the URSP rule includes the MBS rule, so the URSP rule also includes the MBS service policy.

In some embodiments, the PCF may trigger establishment of the MBS session based on a request from the AF. In certain embodiment(s), the PCF may transmit the generated PCC rule to the SMF, and the SMF establishes an MBS session corresponding to the MBS service according to the received PCC rule. The MBS session only includes a user plane connection from the (R)AN to an anchor UPF. That is, when the MBS session only includes one UPF, user plane connection of the MBS session only includes an N3 connection between the (R)AN and the anchor UPF. When the MBS session includes a plurality of UPFs, the user plane connection of the MBS session includes both the N3 connection between the (R)AN and the UPF and N9 connection between the UPFs.

As shown in FIG. 2, a process that the SMF establishes the MBS session corresponding to the MBS service according to the received PCC rule is implemented by using functional entities such as PCF, UPF, SMF, AMF and (R)AN (for example, step 3 in FIG. 2). In the process of establishing the MBS session, the PCF may obtain SMF information related to the MBS service by interacting with UDM (Unified Data Management), and the SMF may also interact with the UDM to obtain AMF information related to the MBS service. The establishing process of the MBS session is not limited in this embodiment.

After the MBS session is created, the PCF returns a response message of the MBS service request to the AF (for example, step 4 in FIG. 2). The service response message includes entry information of the MBS service, which is used for informing the AF that response for the service request message has been performed. The service response message may include address information of DNAI (DN Access Identifier) and/or the UPF.

In another embodiment, the PCF may not trigger the establishment of the MBS session after receiving the service request message transmitted by the AF. In certain embodiment(s), after the PCF performs generation of the MBS rule and the PCC rule, the PCF returns a notification message for the service request message to the AF, and the notification message instructs the PCF to receive or reject the MBS service request initiated by the AF. When the UE triggers establishment of a session of the MBS service requested by the AF, the PCF transmits a service response message of session establishment to the AF after a corresponding session is established. The service response message includes the entry information of the MBS service, which is used for informing the AF that the response for the MBS service requested by the service request message has been performed. The service response message may include address information of DNAI (DN Access Identifier) and/or the UPF.

It can be seen that, through the above process, if the AF transmits a plurality of service request messages or a service request message for requesting a plurality of MBS services to the PCF, a plurality of MBS sessions can be created in the 5G mobile communication network.

When the UE is registered in the 5G mobile communication network, or when the UE has been registered in the 5G mobile communication network and moved to the MBS service region, or when the UE has been registered in the 5G mobile communication network and moved to the MBS service region, and a mobility management state of the UE itself is converted to a connection state (for example, step 5 of FIG. 2), the PCF transmits the MBS rule or the URSP rule (for example, step 6 of FIG. 2) to the UE. The mobility management state of the UE is understood as a management state of an aspect whether the UE is registered in a mobile network, or an NAS connection between the UE and a mobile core network control plane AMF, and the like. When the mobility management state is converted to the connection state, the UE can provide guarantee for implementation of various network services of the UE.

Because the MBS rule or URSP rule includes the MBS service policy and the MBS service policy includes the MBS service region, the UE can obtain an effective service region of the MBS service according to the received MBS rule or URSP rule, and the UE can determine whether it is located in the effective service region of the MBS service according to its own position information. In addition, in a case that the MBS service has specific restrictions on service time, the MBS service policy includes the MBS effective service time, so the UE can further know the effective service time of the MBS service according to the received MBS rule or URSP rule.

If the UE is located in the effective service region of the MBS service, and current time is also in the effective service time of the MBS service, the UE can access the MBS service in the effective service region and the effective service time of the MBS service.

Exemplarily, a flow that the UE accesses the MBS service may be as follows: When the UE accesses the MBS service, it determines whether there is an MBS session corresponding to a target MBS service that the UE accesses in the 5G mobile communication network according to the received MBS rule or URSP rule. If it is determined that there is the MBS session, the UE joins the MBS session to access the target MBS service in the joined MBS session (for example, step 7 of FIG. 2). If it is determined that there is no MBS session corresponding to the target MBS service, the UE initiates an MBS session creation request for the target MBS service, to create a new MBS session in the 5G mobile communication network.

In certain embodiment(s), after the UE determines that there is the MBS session corresponding to the target MB S service, the UE transmits a session joining request message for the MBS to the UPF. The session joining request message may be an IGMP (Internet Group Management Protocol) message. After receiving the session joining request message, the UPF transmits a first notification message to the SMF, to inform the SMF that new UE requests to join the MB S session corresponding to the target MBS service, thereby enabling the UE to join the MBS session.

In some other embodiments, after receiving the session joining request message, the UPF further transmits a second notification message to a service server AS corresponding to the target MBS service, to inform the AS that new UE accesses the target MBS service. After receiving the second notification message, the AS may issue index report request information to the UE accessing the target MBS service.

Therefore, based on a service process shown in FIG. 2, the 5G MBS service system can not only support desirables of the effective service region and the effective service time of the MBS service, but also support a desirable that the MBS service server can sense that the UE joins the MBS. Compared with controlling the UE to access the MBS service through the control plane, in this embodiment, because the UE actively accesses the MBS service from the user plane based on the MBS rule or URSP rule issued by the PCF, signaling load of the 5G MBS system can be reduced to a certain extent.

Figure 3:
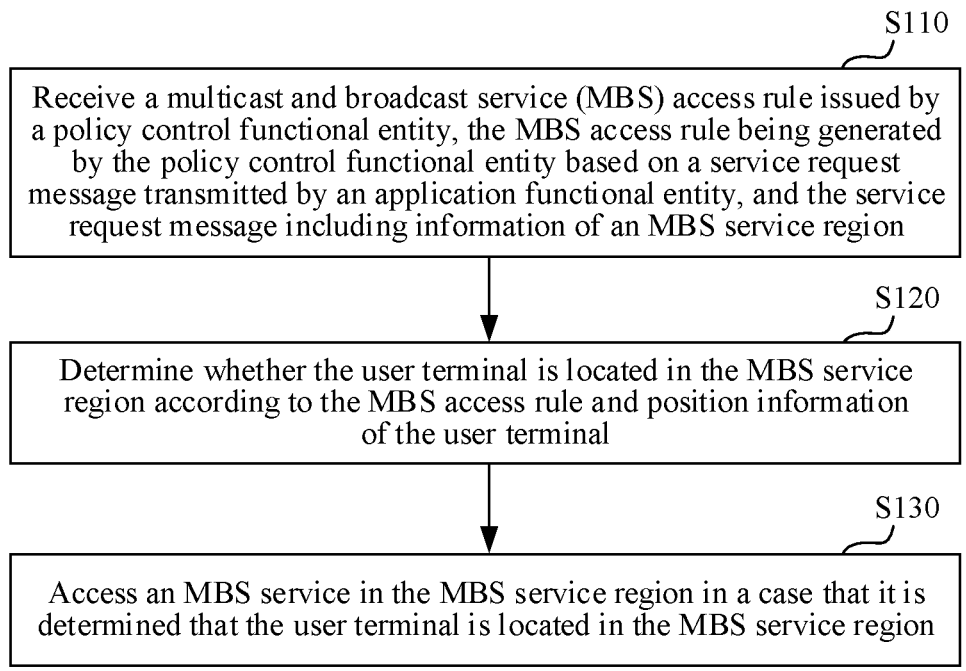
FIG. 3 is a schematic flowchart of a communication method of a multicast and broadcast service according to certain embodiment(s) of the present disclosure.

FIG. 3 is a flowchart of a communication method of a multicast and broadcast service according to an exemplary embodiment of the present disclosure. The communication method of a multicast and broadcast service may be performed by UE in the 5G mobile communication network shown in FIG. 1. The communication method of a multicast and broadcast service includes at least S110 to S130, and is described in detail as follows:

S110. Receive a multicast and broadcast service (MBS) rule issued by a policy control functional entity, the MBS rule being generated by the policy control functional entity based on a service request message transmitted by an application functional entity, and the service request message including information of an MBS service region.

In this embodiment, the user terminal involved in a communication process of the MBS service is referred to as UE for short, the user plane functional entity is referred to as UPF for short, the access and mobility management functional entity is referred to as AMF for short, the session management functional entity is referred to as SMF for short, the application functional entity is referred to as AF for short, and the policy control functional entity is referred to as PCF for short.

In the following embodiments, abbreviations of each functional entity included in the mobile communication network involved in the communication process of the MBS service may refer to abbreviations of each functional entity listed in this embodiment, or correspond to functional entities having the same function added in the 5G network architecture.

In some embodiments, after receiving the service request message transmitted by the AF, the PCF generates the MBS rule according to the service request message, and transmits the generated MBS rule to the UE, so that the UE can receive the MBS rule issued by the PCF. In another embodiment, after receiving the service request message transmitted by the AF, the PCF generates the URSP rule according to the service request message, and issues the URSP rule to the UE. Because the URSP rule includes the MBS rule, the UE can still receive the MBS rule issued by the PCF.

The service request message includes the information of the MBS service region, so the MBS rule generated by the PCF according to the service request message also includes the MBS service region. The service request message may further include the information of the MBS effective service time, so the MBS rule generated by the PCF may further include the MBS effective service time.

In some embodiments, the UE may receive the MBS rule issued by the PCF when registered in the mobile communication network. In some other embodiments, the UE may receive the MBS rule issued by the PCF when the UE has been registered in the mobile communication network and moved to the MBS service region. The mobile communication network may be the 5G mobile communication network.

S120. Determine whether the user terminal is located in the MBS service region according to the MBS rule and position information of the user terminal.

As mentioned above, the MBS rule includes the MBS service region, so the UE can compare its own position information with the MBS service region included in the MBS rule, to determine whether the UE is located in the MBS service region.

If the position information of the UE is located in the MBS service region, it is determined that the UE is located in the MBS service region, and the UE can access a corresponding MBS service. If the position information of the UE is not in the MBS service region, it is determined that the UE is not in the MBS service region, and the UE cannot access the corresponding MBS service.

Exemplarily, the position information of the UE may be GPS (Global Positioning System) position data obtained by the UE based on a GPS module configured by the UE, or may further be position information that can be recognized by the 5G mobile communication network, such as cell information, tracking region information, and the like. The MBS service region may be an effective position range corresponding to the MBS, for example, the GPS position data, or may further be the position information that can be recognized by the 5G mobile communication network, such as the cell information, tracking region information, and the like.

S130. Access an MBS service in the MBS service region in a case that it is determined that the user terminal is located in the MBS service region.

In this embodiment, if the UE determines that it is located in a service region of an MBS service, it means that the UE meets a restriction condition of a corresponding MBS service for the MBS service region, so the UE can access the MBS service in the MBS service region.

When the UE determines a target MBS service to be accessed, it determines whether there is an MBS session corresponding to the target MBS service in the mobile communication network according to the MBS rule issued by the PCF. If the UE determines that there is the MBS session, it joins the MBS session, to access the target MBS service.

The MBS session corresponding to the target MBS service in the mobile communication network is an MBS session created in the mobile communication network through the SMF after the PCF generates a PCC rule corresponding to the target MBS service according to the service request information corresponding to the target MBS service transmitted by the AF, and the PCF transmits the PCC rule to the SMF. The MBS session only includes the user plane connection from the (R)AN to the anchor UPF. That is, when the MBS session only includes one UPF, user plane connection of the MBS session only includes an N3 connection between the (R)AN and the anchor UPF. When the MBS session includes a plurality of UPFs, the user plane connection of the MBS session includes both the N3 connection between the (R)AN and the UPF and N9 connection between the UPFs.

The UE transmits a session joining request message for the MBS session to the UPF, to trigger the UPF to transmit the first notification message to the SMF through the session joining request message, and the first notification message is used for indicating that new UE requests to join the MBS session. The SMF performs corresponding control processing on the MBS session according to the received first notification message, to cause the UE to join the MBS session.

In another embodiment, the session joining request message may further be used for triggering the UPF to transmit the second notification message that the UE accesses the target MB S service to the service server AS corresponding to the target MBS service. After receiving the second notification message, the AS can transmit the index report request information to the UE, thereby achieving a desirable that the AS can sense that the UE joins the MBS service.

If it is determined that there is no MBS session corresponding to the target MBS service in the mobile communication network, the UE initiates the MBS session creation request for the target MBS service, to request to create the MBS session corresponding to the target MBS service in the mobile communication network. The UE joins the created MBS session, that is, it can access the target MBS service.

It can be seen that, the method provided in the embodiment achieves restriction on the service region of the MBS service, and only the UE located in the MBS service region can join the MBS session corresponding to the MBS service region, so that a corresponding MBS service can be accessed based on the joined MBS session. The UE actively accesses the MBS service based on the MBS rule issued by the PCF, so that the MBS service is joined based on the mode of the user plane, and the signaling load of the mobile communication network can be reduced.

Figure 4:
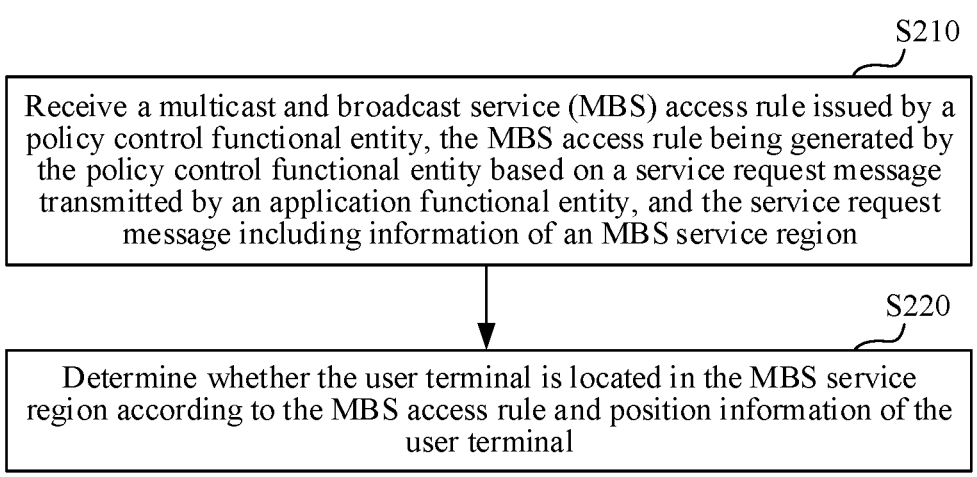
FIG. 4 is a schematic flowchart of another communication method of a multicast and broadcast service according to certain embodiment(s) of the present disclosure.

FIG. 4 is a flowchart of a communication method of a multicast and broadcast service according to another exemplary embodiment of the present disclosure. The communication method of a multicast and broadcast service may be performed by AF in the 5G mobile communication network shown in FIG. 1. The communication method of a multicast and broadcast service includes at least S210 to S220, and is described in detail as follows:

S210. Generate a service request message, the service request message including information of an MBS service region, the service request message being used for triggering a policy control functional entity to generate an MBS rule for a user terminal, and the MBS rule being used for instructing the user terminal to access the MBS service in the MBS service region.

As described in the embodiments, to implement supporting desirables of the service region of the MBS service, the AF transmits the service request message to the PCF, to trigger the PCF to generate the MBS rule for the UE through the service request message.

The service request message is generated by the AF according to relevant information of the MBS service requested in the mobile communication network. In certain embodiment(s), if the MBS service requested by the AF has a specific service region, the service request message includes the information of the MBS service region, so that the MBS rule generated by the PCF also includes the information of the MBS service region, and the MBS rule is used for instructing the UE to access the MBS service in the MBS service region.

If the MBS service requested by the AF has specific service time, the service request message includes the information of the MBS effective service time, so the MBS rule generated by the PCF further includes the information of the MBS effective service time, and the MBS rule is used for instructing the UE to access the MBS service within the MBS service region and the MBS effective service time.

The service request message may further include information of an IP address and QoS desirable of the MBS service requested by the AF, so that the PCF generates a PCC rule of the MBS service according to the information of the IP address and QoS desirable of the MBS service included in the service request message. The PCC rule is used for controlling the SMF to manage the MBS session, for example, controlling the SMF to create an MBS session corresponding to the MBS service requested by the AF in the mobile communication network. In some embodiments, the service request message may further include the AF identification information.

S220. Transmit the service request message to the policy control functional entity.

In this embodiment, the AF may directly transmit the generated service request message to the PCF, or the AF may transmit the service request message to the NEF, to forward the service request message to the PCF based on the NEF. The AF may select a specific manner of transmitting the service request message to the PCF according to situations such as network deployment of the mobile communication network and whether the AF is trusted relative to the PCF. This is not limited in this embodiment.

In some embodiments, the service request message transmitted by the AF to the NEF is forwarded to the PCF after the NEF performs authentication on the MBS service requested by the AF. In certain embodiment(s), after receiving the service request message transmitted by the AF, the NEF performs authentication on the MBS service requested by the AF according to the AF identification information included in the service request message. If the authentication is passed, it means that the NEF receives the request of the AF and forwards the service request message to the PCF.

As described in the embodiments, after the service request message of the AF is transmitted to the PCF, the PCF generates the MBS rule or the URSP rule of the MBS service requested by the AF according to the received service request message, the URSP rule including the MBS rule, and also generates the PCC rule of the MBS service, to trigger the UE to access the MBS service in the MBS service region through the MBS rule or the URSP rule, and controls the SMF to create the MBS session corresponding to the MBS service requested by the AF in the mobile communication network through the PCC rule, to support the desirables of the MBS service region and reduce the signaling load of the mobile communication network.

A detailed flow after the AF transmits the service request message to the PCF is referred to contents described in the embodiments and the following embodiments. Details are not repeated herein.

Figure 5:
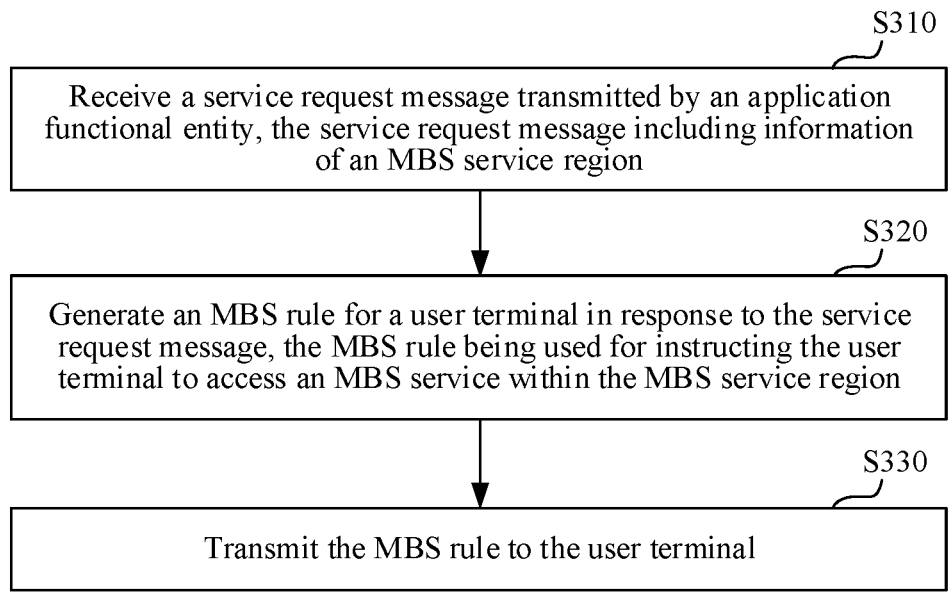
FIG. 5 is a schematic flowchart of another communication method of a multicast and broadcast service according to certain embodiment(s) of the present disclosure.

FIG. 5 is a flowchart of a communication method of a multicast and broadcast service according to another exemplary embodiment of the present disclosure. The communication method of a multicast and broadcast service may be performed by PCF in the 5G mobile communication network shown in FIG. 1. The communication method of a multicast and broadcast service includes at least S310 to S330, and is described in detail as follows:

S310. Receive a service request message transmitted by an application functional entity, the service request message including information of an MBS service region.

In this embodiment, the service request message received by the PCF may be directly or indirectly transmitted by the AF. For example, after the AF transmits the service request message to the NEF, the service request message is forwarded to the PCF based on the NEF.

The information of the MBS service region in the service request message transmitted by the AF received by the PCF may be a position range, indicating that the MBS service requested by the AF can provide service within the position range. If the MBS service requested by the AF also has the specific service time, the service request message further includes the information of the effective service time of the MBS service.

S320. Generate an MBS rule for a user terminal in response to the service request message, the MBS rule being used for instructing the user terminal to access an MBS service within the MBS service region.

In response to the received service request message, the PCF generates an MBS rule for the UE and including the MBS service policy, for example, may include information such as traffic description information, routing information, effective region/effective time of the MBS service policy, and the like. The traffic description information may include information such as application description information, IP address of the MBS service, domain name information, multicast group identification information, connection attribute. The routing information may include information such as S-NSSAI, DNN, and the like. The effective region/effective time of the MBS service policy corresponds to information of the MBS service region and information of the MBS effective service time included in the service request message transmitted by the AF.

Alternatively, the PCF may generate a URSP rule for the UE in response to the service request message. The URSP rule includes the MBS rule, and the MBS rule in the URSP rule is used for indicating that the UE can access the MBS service in the MBS service region.

S330. Transmit the MBS rule to the user terminal.

In this embodiment, the PCF may transmit the MSB rule to the UE by directly transmitting the generated MBS rule to the UE, or transmitting the generated URSP rule to the UE. Because the URSP rule includes the MBS rule, the UE can receive the MBS rule.

In addition, the PCF may transmit the MBS rule or the URSP rule to the UE when detecting that the UE is registered in the mobile communication network; or transmit the MBS rule or the URSP rule to the UE when detecting that the UE is registered in the mobile communication network and moves to the MBS service region; or transmit the MBS rule or the URSP rule to the UE when the UE has been registered in the 5G mobile communication network and moved to the MBS service region, and the mobility management state of the UE is converted to the connection state. This is not limited in the embodiment.

In another embodiment, the service request message may further include information of an IP address and QoS desirable of the MBS service requested by the AF, so that the PCF generates a PCC rule of the MBS service according to the information of the IP address and QoS desirable of the MBS service included in the service request message. The PCC rule is used for controlling the SMF to manage the MBS session, for example, controlling the SMF to create an MBS session corresponding to the MBS service in the mobile communication network. The MBS session only includes the user plane connection from the (R)AN to the anchor UPF. That is, when the MBS session only includes one UPF, user plane connection of the MBS session only includes an N3 connection between the (R)AN and the anchor UPF. When the MBS session includes a plurality of UPFs, the user plane connection of the MBS session includes both the N3 connection between the (R)AN and the UPF and N9 connection between the UPFs.

As described in the embodiments, after the PCF issues the MBS rule or the URSP rule to the UE, the UE determines whether it is located in the MBS service region according to the received MBS rule or the URSP rule, and its own position information. If it is determined that the UE is in the MBS service region, the UE accesses a corresponding MBS service in the MBS service region. In certain embodiment (s), the UE joins the MBS session corresponding to the MBS service in the MBS service region, to access the MBS service. Therefore, this embodiment can support the desirables of the MBS service region, implement joining of the MBS service from the user plane, and reduce the signaling load of the mobile communication network. When there is no established MBS session in the MBS service region, the UE initiates an MBS session establishing process.

Figure 6:
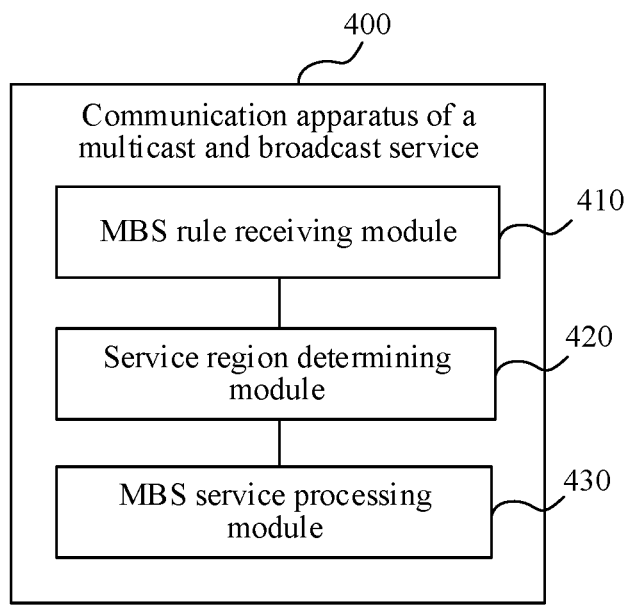
FIG. 6 is a schematic block diagram of a communication apparatus of a multicast and broadcast service according to certain embodiment(s) of the present disclosure.

FIG. 6 is a block diagram of a communication apparatus of a multicast and broadcast service according to an exemplary embodiment. The exemplary communication apparatus 400 of a multicast and broadcast service may be configured on the UE in the 5G mobile communication network shown in FIG. 1.

As shown in FIG. 6, in an exemplary embodiment, the communication apparatus 400 of a multicast and broadcast service may include: an MBS rule receiving module 410, a service region determining module 420, and an MBS service processing module 430. The MBS rule receiving module 410 is configured to receive an MBS rule issued by a policy control functional entity, the MBS rule being generated by the policy control functional entity based on a service request message transmitted by an application functional entity, and the service request message including information of an MBS service region. The service region determining module 420 is configured to determine whether the user terminal is located in the MBS service region according to the MBS rule and position information of the user terminal. The MBS service processing module 430 is configured to access an MBS service in the MBS service region in a case that it is determined that the user terminal is located in the MBS service region.

In another exemplary embodiment, the MBS service processing module 430 includes an MBS session determining unit, an MBS session joining unit, and an MBS session creation unit. The MBS session determining unit is configured to determine, according to the MBS rule and a target MBS service that the user terminal accesses, whether there is an MBS session corresponding to the target MBS service. The MBS session joining unit is configured to join the MBS session to access the target MBS service in a case that it is determined that there is the MBS session. The MBS session creation unit is configured to initiate an MBS session creation request for the target MBS service in a case that it is determined that there is not the MBS session.

In another exemplary embodiment, the MBS session joining unit is configured to transmit a session joining request message for the MBS session to the user plane functional entity. The session joining request message may be used for triggering the user plane functional entity to transmit a first notification message that the user terminal requests to join the MBS session to the session management functional entity, and may further be used for triggering the user plane functional entity to transmit a second notification message that the user terminal accesses the target MBS service to a service server corresponding to the target MBS service.

In another exemplary embodiment, the MBS rule receiving module 410 is configured to receive a user equipment routing selection policy (URSP) rule supporting a multicast service issued by the policy control functional entity, the URSP rule including the MBS rule.

In another exemplary embodiment, the MBS rule receiving module 410 is configured to receive the MBS rule issued by the policy control functional entity in a case that it is registered in a mobile communication network; or receive the MBS rule issued by the policy control functional entity in a case that it has been registered in the mobile communication network and moved to the MBS service region; or receive the MBS rule issued by the policy control functional entity in a case that it has been registered in the mobile communication network and moved to the MBS service region, and a mobility management state is converted to a connection state.

Figure 7:
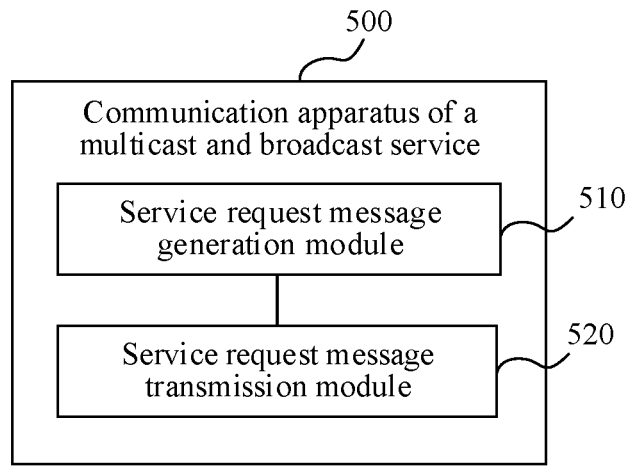
FIG. 7 is a schematic block diagram of another communication apparatus of a multicast and broadcast service according to certain embodiment(s) of the present disclosure.

FIG. 7 is a block diagram of a communication apparatus of a multicast and broadcast service according to another exemplary embodiment. The exemplary communication apparatus 500 of a multicast and broadcast service may be configured on the AF in the 5G mobile communication network shown in FIG. 1.

As shown in FIG. 7, in an exemplary embodiment, the communication apparatus 500 of a multicast and broadcast service may include a service request message generation module 510 and a service request message transmission module 520. The service request message generation module 510 is configured to generate a service request message. The service request message includes information of an MBS service region, and the service request message is used for triggering a policy control functional entity to generate an MBS rule for a user terminal and a PCC rule for MBS session management. The MBS rule is used for instructing the user terminal to access the MBS service in the MBS service region, and the PCC rule is used for controlling the SMF to manage a corresponding MB S session. The service request message transmission module 520 is configured to transmit the service request message to the policy control functional entity.

In another exemplary embodiment, the service request message transmission module 520 is configured to transmit the service request message to the policy control functional entity, or transmit the service request message to a network exposure functional entity, and the network exposure functional entity forwards the service request message to the policy control functional entity.

In another exemplary embodiment, the service request message further includes information of MBS effective service time, and the MBS rule is further used for instructing the user terminal to access the MBS service within the MBS service region and the MBS effective service time.

Figure 8:
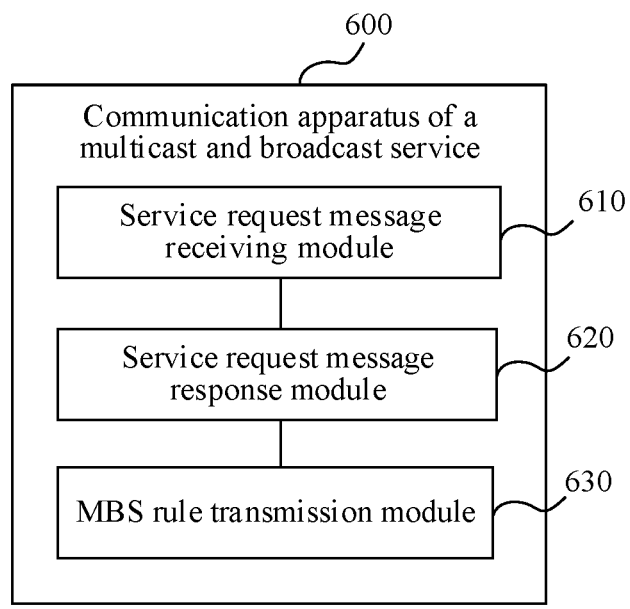
FIG. 8 is a schematic block diagram of another communication apparatus of a multicast and broadcast service according to certain embodiment(s) of the present disclosure.

FIG. 8 is a block diagram of a communication apparatus of a multicast and broadcast service according to another exemplary embodiment. The exemplary communication apparatus 600 of a multicast and broadcast service may be configured on the PCF in the 5G mobile communication network shown in FIG. 1.

As shown in FIG. 8, in an exemplary embodiment, the communication apparatus 600 of a multicast and broadcast service may include a service request message receiving module 610, a service request message response module 620, and an MBS rule transmission module 630. The service request message receiving module 610 is configured to receive a service request message transmitted by an application functional entity, the service request message including information of an MBS service region. The service request message response module 620 is configured to generate an MBS rule for a user terminal in response to the service request message, the MBS rule being used for instructing the user terminal to access an MBS service within the MBS service region. The MBS rule transmission module 630 is configured to transmit the MBS rule to the user terminal.

In another exemplary embodiment, the communication apparatus 600 of a multicast and broadcast service further includes a PCC rule generation module and a PCC rule transmission module. The PCC rule generation module is configured to generate a policy control and charging (PCC) rule in response to the service request message, the PCC rule being used for controlling a session management functional entity to manage an MBS session. The PCC rule transmission module is configured to transmit the PCC rule to the session management functional entity.

The apparatus and the method provided in the embodiments belong to the same concept. The specific manners of performing operations by each module and unit have been described in detail in the method embodiments, and details are not repeated herein.

The embodiments of the present disclosure further provide an electronic device. The electronic device includes a processor and a memory, the memory storing computer-readable instructions, and the computer-readable instructions, when executed by the processor, implementing the communication method of a multicast and broadcast service described above.

Figure 9:
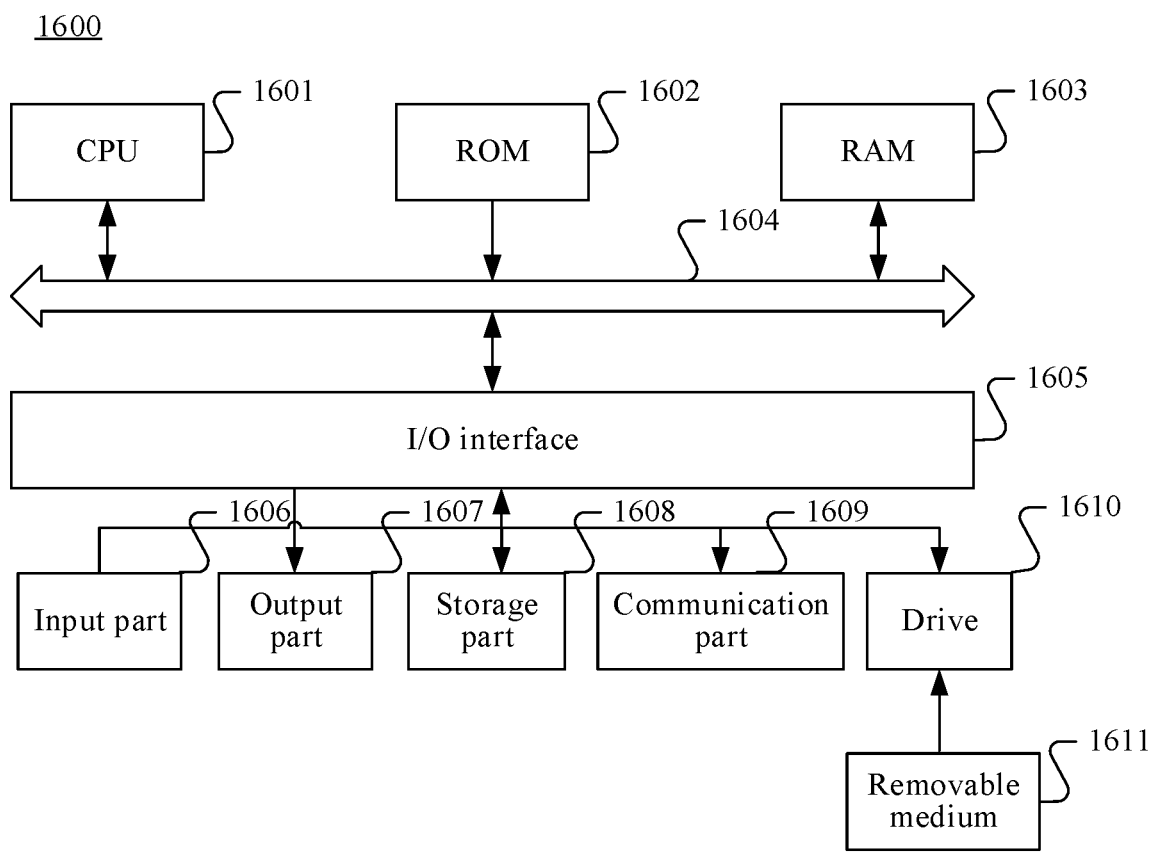
FIG. 9 is a schematic structural diagram of an electronic device according to certain embodiment(s) of the present disclosure.

FIG. 9 is a schematic structural diagram of a computer system adapted to implement an electronic device according to an embodiment of the present disclosure.

The computer system 1600 of the electronic device shown in FIG. 9 is merely an example, and does not constitute any limitation on functions and use ranges of the embodiments of the present disclosure.

As shown in FIG. 9, the computer system 1600 includes a central processing unit (CPU) 1601, which may perform various suitable actions and processing based on a program stored in a read-only memory (ROM) 1602 or a program loaded from a storage part 1608 into a random access memory (RAM) 1603, for example, perform the method described in the embodiments. The RAM 1603 further stores various programs and data desirable for operating the system. The CPU 1601, the ROM 1602, and the RAM 1603 are connected to each other through a bus 1604. An input/output (I/O) interface 1605 is also connected to the bus 1604.

The following components are connected to the I/O interface 1605: an input part 1606 including a keyboard and a mouse, etc.; an output part 1607 including a cathode ray tube (CRT), a liquid crystal display (LCD), a speaker, or the like; a storage part 1608 including hard disk, etc.; and a communication part 1609 including a network interface card such as a local area network (LAN) card, a modem, or the like. The communication part 1609 performs communication processing by using a network such as the Internet. A driver 1610 is also connected to the I/O interface 1605 as desired. A removable medium 1611, such as a magnetic disk, an optical disc, a magneto-optical disk, or a semiconductor memory, is installed on the driver 1610 as desired, so that a computer program read from the removable medium is installed into the storage part 1608 as desired.

Particularly, according to an embodiment of the present disclosure, the processes described in the following by referring to the flowcharts may be implemented as computer software programs. For example, an embodiment of the present disclosure includes a computer program product. The computer program product includes a computer program stored in a computer-readable medium. The computer program includes a computer program used for performing a method shown in the flowchart. In such an embodiment, the computer program may be downloaded and installed through the communication part 1609 from a network, and/or installed from the removable medium 1611. When the computer program is executed by the CPU 1601, the various functions defined in the system of the present disclosure are executed.

The computer-readable medium shown in the embodiments of the present disclosure may be a computer-readable signal medium or a computer-readable storage medium or any combination of two. The computer-readable storage medium may be, for example, an electrical, magnetic, optical, electromagnetic, infrared, or semiconductor system, apparatus, or device, or any combination thereof. More specific examples of the computer-readable storage medium may include, but are not limited to: an electrical connection having one or more wires, a portable computer magnetic disk, a hard disk, a random access memory (RAM), a read-only memory (ROM), an erasable programmable read-only memory (EPROM), a flash memory, an optical fiber, a compact disk read-only memory (CD-ROM), an optical storage device, a magnetic storage device, or any appropriate combination thereof. In the present disclosure, the computer-readable storage medium may be any tangible medium including or storing a program, and the program may be used by or used in combination with an instruction execution system, apparatus, or device. In the present disclosure, a computer-readable signal medium may include a data signal in a baseband or propagated as a part of a carrier wave, the data signal carrying a computer-readable program. A data signal propagated in such a way may assume a plurality of forms, including, but not limited to, an electromagnetic signal, an optical signal, or any appropriate combination thereof. The computer-readable signal medium may further be any computer-readable medium in addition to a computer-readable storage medium. The computer-readable medium may send, propagate, or transmit a program that is used by or used in combination with an instruction execution system, apparatus, or device. The computer program included in the computer-readable medium may be transmitted using any suitable medium, including but not limited to: a wireless medium, a wired medium, and the like, or any suitable combination thereof.

The flowcharts and block diagrams in the accompanying drawings illustrate possible system architectures, functions, and operations that may be implemented by a system, a method, and a computer program product according to various embodiments of the present disclosure. Each box in a flowchart or a block diagram may represent a module, a program segment, or a part of code. The module, the program segment, or the part of code includes one or more executable instructions used for implementing designated logic functions. In some implementations used as substitutes, functions annotated in boxes may alternatively occur in a sequence different from that annotated in an accompanying drawing. For example, actually two boxes shown in succession may be performed in parallel, and sometimes the two boxes may be performed in a reverse sequence. This is determined by a related function. Each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

A related unit described in the embodiments of the present disclosure may be implemented in a software manner, or may be implemented in a hardware manner, and the unit described may also be set in a processor. Names of the units do not constitute a limitation on the units in a specific case.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

Another aspect of the present disclosure further provides a computer-readable storage medium. The computer-readable storage medium stores a computer program, the computer program, when executed by a processor, implementing the communication method of a multicast and broadcast service described above. The computer-readable medium may be included in the electronic device described in the embodiments, or may exist independently and is not disposed in the electronic device.

Another aspect of the present disclosure further provides a computer program product or a computer program, the computer program product or the computer program including computer instructions, the computer instructions being stored in a computer-readable storage medium. A processor of a computing device reads the computer instructions from the computer-readable storage medium, and executes the computer instructions, to cause the computing device to perform the communication method of a multicast and broadcast service provided in the embodiments.

What is described above is merely exemplary embodiments of the present disclosure, and is not intended to limit the embodiments of the present disclosure. A person of ordinary skill in the art can easily make equivalent changes or modifications according to the main concept and spirit of the present disclosure. Therefore, the protection scope of the present disclosure is subject to the protection scope specified in the claims.

What is claimed is:

1. A communication method of a multicast and broadcast service performed by a user terminal, the method comprising:
   receiving a multicast and broadcast service (MBS) rule issued by a policy control functional entity, the MBS rule being generated by the policy control functional entity based on a service request message transmitted by an application functional entity, and the service request message comprising information of an MBS service region;
   determining whether the user terminal is located in the MBS service region according to the MBS rule and position information of the user terminal; and
   accessing an MBS service in the MBS service region in response to a determination that the user terminal is located in the MBS service region.

2. The method according to claim 1, wherein accessing the MBS service comprises:
   determining, according to the MBS rule and a target MBS service that the user terminal accesses, whether there is an MBS session corresponding to the target MBS service; and
   joining the MBS session to access the target MBS service in response to a determination that there is the MBS session.

3. The method according to claim 2, further comprising:
   initiating an MBS session creation request for the target MBS service in response to a determination that there is not the MBS session.

4. The method according to claim 2, wherein joining the MBS session comprises:
   transmitting a session joining request message for the MBS session to a user plane functional entity, to join the MBS session, the session joining request message being used for triggering the user plane functional entity to transmit a first notification message that is used for the user terminal to request to join the MBS session to a session management functional entity.

5. The method according to claim 4, wherein the session joining request message is further used for triggering the user plane functional entity to transmit a second notification message that the user terminal accesses the target MBS service to a service server corresponding to the target MBS service.

6. The method according to claim 1, wherein receiving the MBS rule comprises:
   receiving a user equipment routing selection policy (URSP) rule supporting a multicast service issued by the policy control functional entity, the URSP rule comprising the MBS rule.

7. The method according to claim 1, wherein receiving the MBS rule comprises:

receiving the MBS rule issued by the policy control functional entity in response to a determination that the MBS rule is registered in a mobile communication network; or receiving the MBS rule issued by the policy control functional entity in response to a determination that the MBS rule has been registered in the mobile communication network and moved to the MBS service region; or receiving the MBS rule issued by the policy control functional entity in response to a determination that the MBS rule has been registered in the mobile communication network and moved to the MBS service region, and its own mobility management state is converted to a connection state.

8. A communication apparatus of a multicast and broadcast service, comprising: a memory storing computer program instructions; and a processor coupled to the memory and configured to execute the computer program instructions and perform:

receiving a multicast and broadcast service (MBS) rule issued by a policy control functional entity, the MBS rule being generated by the policy control functional entity based on a service request message transmitted by an application functional entity, and the service request message comprising information of an MBS service region;

determining whether the user terminal is located in the MBS service region according to the MBS rule and position information of the user terminal; and accessing an MBS service in the MBS service region in response to a determination that the user terminal is located in the MBS service region.

9. The communication apparatus according to claim 8, wherein accessing the MBS service includes:

determining, according to the MBS rule and a target MBS service that the user terminal accesses, whether there is an MBS session corresponding to the target MBS service; and joining the MBS session to access the target MBS service in response to a determination that there is the MBS session.

10. The communication apparatus according to claim 9, wherein the processor is further configured to execute the computer program instructions and perform:

initiating an MBS session creation request for the target MBS service in response to a determination that there is not the MBS session.

11. The communication apparatus according to claim 10, wherein joining the MB S session includes:

transmitting a session joining request message for the MBS session to a user plane functional entity, to join the MBS session, the session joining request message being used for triggering the user plane functional entity to transmit a first notification message that is used for the user terminal to request to join the MBS session to a session management functional entity.

12. The communication apparatus according to claim 11, wherein the session joining request message is further used for triggering the user plane functional entity to transmit a second notification message that the user terminal accesses the target MBS service to a service server corresponding to the target MBS service.

13. The communication apparatus according to claim 8, wherein receiving the MBS rule includes:

receiving a user equipment routing selection policy (URSP) rule supporting a multicast service issued by the policy control functional entity, the URSP rule comprising the MBS rule.

14. The communication apparatus according to claim 8, wherein receiving the MBS rule includes:

receiving the MBS rule issued by the policy control functional entity in response to a determination that the MBS rule is registered in a mobile communication network; or receiving the MBS rule issued by the policy control functional entity in response to a determination that the MBS rule has been registered in the mobile communication network and moved to the MBS service region; or receiving the MBS rule issued by the policy control functional entity in response to a determination that the MBS rule has been registered in the mobile communication network and moved to the MBS service region, and its own mobility management state is converted to a connection state.

15. A non-transitory computer-readable storage medium storing computer program instructions executable by at least one processor to perform:

receiving a multicast and broadcast service (MBS) rule issued by a policy control functional entity, the MBS rule being generated by the policy control functional entity based on a service request message transmitted by an application functional entity, and the service request message comprising information of an MBS service region;

determining whether the user terminal is located in the MBS service region according to the MBS rule and position information of the user terminal; and accessing an MBS service in the MBS service region in response to a determination that the user terminal is located in the MBS service region.

16. The non-transitory computer-readable storage medium according to claim 15, wherein accessing the MBS service includes:

determining, according to the MBS rule and a target MBS service that the user terminal accesses, whether there is an MBS session corresponding to the target MBS service; and joining the MBS session to access the target MBS service in response to a determination that there is the MBS session.

17. The non-transitory computer-readable storage medium according to claim 16, wherein the computer program instructions are further executable by the at least one processor to perform:

initiating an MBS session creation request for the target MBS service in response to a determination that there is not the MBS session.

18. The non-transitory computer-readable storage medium according to claim 17, wherein joining the MBS session includes:

transmitting a session joining request message for the MBS session to a user plane functional entity, to join the MBS session, the session joining request message being used for triggering the user plane functional entity to transmit a first notification message that is used for the user terminal to request to join the MBS session to a session management functional entity.

19. The non-transitory computer-readable storage medium according to claim 18, wherein the session joining request message is further used for triggering the user plane functional entity to transmit a second notification message that the user terminal accesses the target MBS service to a service server corresponding to the target MBS service.

20. The non-transitory computer-readable storage medium according to claim 15, wherein receiving the MBS rule includes:

receiving a user equipment routing selection policy (URSP) rule supporting a multicast service issued by the policy control functional entity, the URSP rule comprising the MBS rule.

* * * * *